No. 703,650. Patented July 1, 1902.
W. J. GLEASON.
LAWN MOWER ATTACHMENT.
(Application filed May 14, 1901.)
(No Model.) 2 Sheets—Sheet 1.

Witnesses:
Louis D. Heinrichs
L. A. Morrison

Inventor
William J. Gleason
By
W. Preston Williams
Atty

No. 703,650. Patented July 1, 1902.
W. J. GLEASON.
LAWN MOWER ATTACHMENT.
(Application filed May 14, 1901.)
(No Model.) 2 Sheets—Sheet 2.
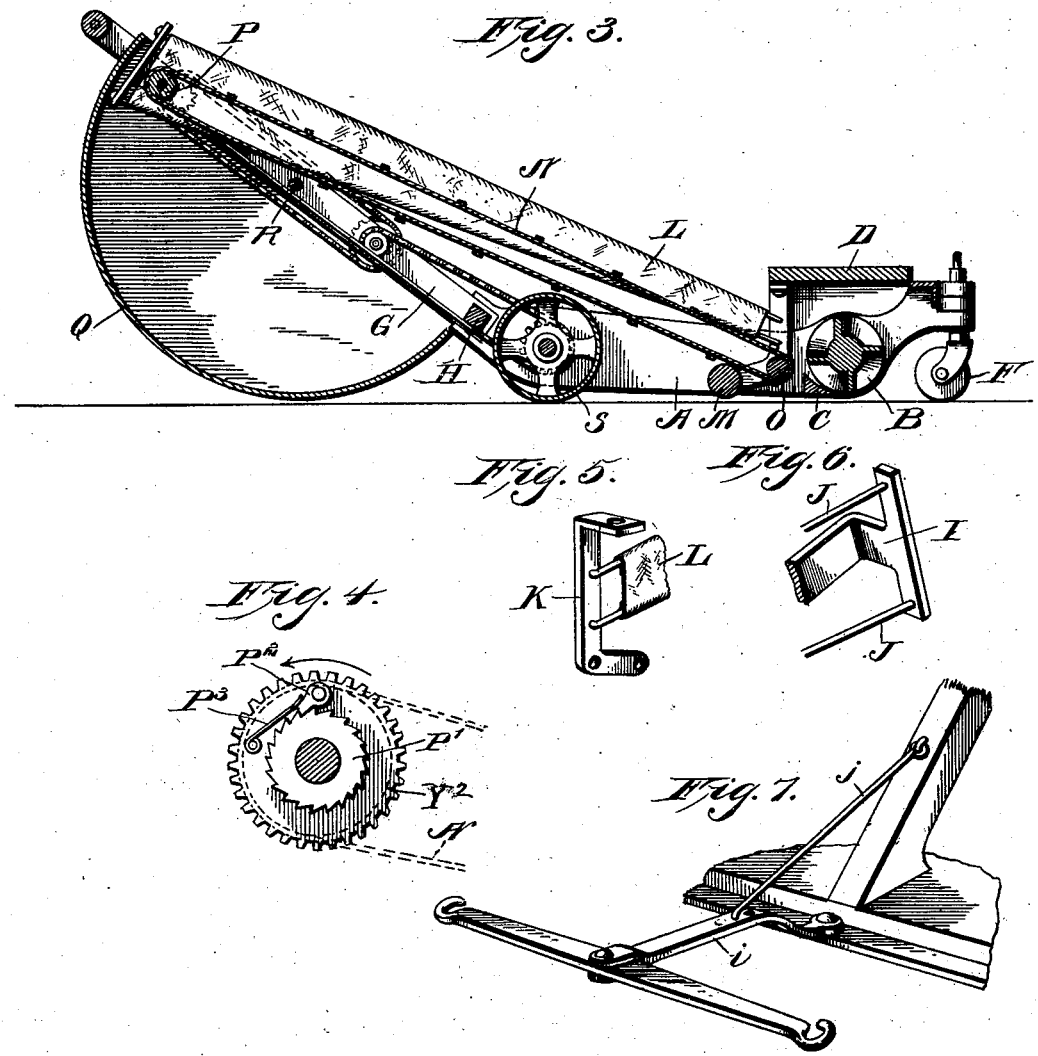

UNITED STATES PATENT OFFICE.

WILLIAM J. GLEASON, OF PHILADELPHIA, PENNSYLVANIA, ASSIGNOR OF ONE-HALF TO JAMES MEGONIGAL, OF PHILADELPHIA, PENNSYLVANIA.

LAWN-MOWER ATTACHMENT.

SPECIFICATION forming part of Letters Patent No. 703,650, dated July 1, 1902.

Application filed May 14, 1901. Serial No. 60,229. (No model.)

*To all whom it may concern:*

Be it known that I, WILLIAM J. GLEASON, a citizen of the United States, residing at Philadelphia, county of Philadelphia, and State of Pennsylvania, have invented a certain new and useful Improvement in Lawn-Mower Attachments, of which the following is a specification.

My invention relates to a new and useful improvement in lawn-mowers, and especially relates to that class of lawn-mowers adapted to be driven by horse-power; but my improvements can also be applied to mowers driven by hand-power, and has for its object to provide a lawn-mower with a grass-receiving receptacle carried in the rear of the machine and providing a traveling apron adapted to convey the cut grass from the rotary cutters to the grass-receiving receptacle and also provide means to be operated from the seat in horse-power machines for dumping the receptacle, and another object is to provide means in horse-power machines whereby the mower can be steered by foot-power.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
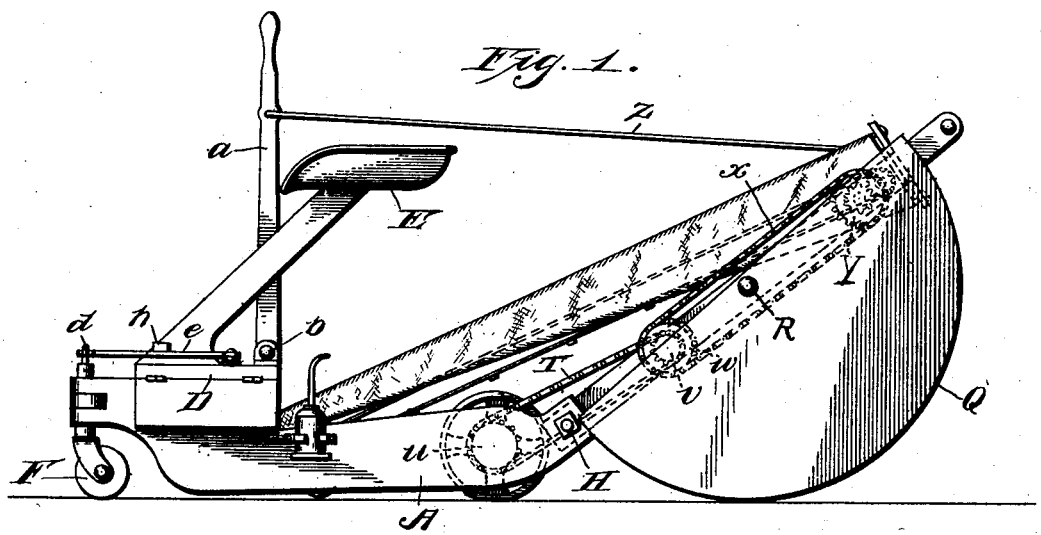
Figure 2:
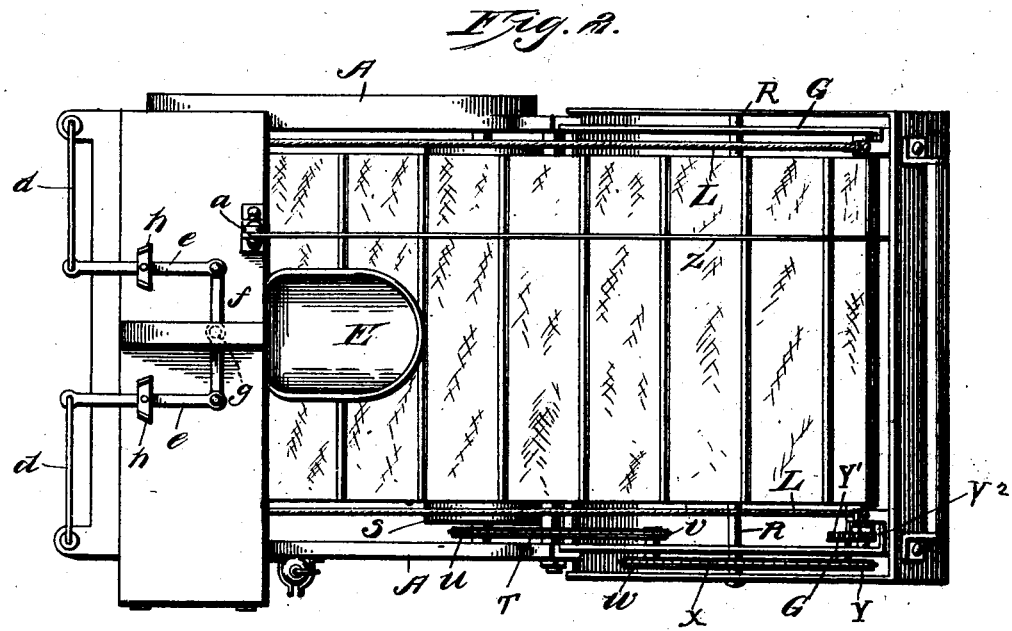

Figure 1 represents a side elevation of my lawn-mower; Fig. 2, a plan view of the same; Fig. 3, a longitudinal section of the same; Fig. 4, a detail view of the gear-wheel upon the roller at the upper end of the apron, showing the ratchet mechanism which allows the machine to travel backward without causing the apron to travel; Fig. 5, a perspective view of the bracket to which the lower end of the side guard is attached; Fig. 6, a perspective view of the end of the side bar at the rear end of the machine; Fig. 7, a perspective view of the draft-bar with the singletree attached thereto; Fig. 8, a side elevation of a hand-power mower with my improvements applied thereto, and Fig. 9 a detail perspective view of the gearing for driving the apron and also shows the manner of attaching the forward end of the grass-receiving receptacle.

In carrying out my invention as embodied in Figs. 1 to 7, inclusive, A represents the side frames of the machine, in which is journaled the cylindrical cutter B, the knives of which operate against the stationary cutting-blade C.

D is a platform, which is hinged at one end to allow access to the cylindrical cutter B. To this platform is secured the seat E.

F represents caster-wheels, which are journaled in the forward end of the framework of the machine and are adapted to support this forward end and keep the stationary cutting-blade C at the right distance from the ground.

G represents side bars, which are secured to the main frame of the machine at the point H and extend rearwardly at an angle, and the ends of these side bars are bent and formed T shape in the manner shown in Fig. 6, as indicated by the letter I. From each prong of these T-shaped portions I rods J extend forward and downward, which are secured to an L-shaped bracket K, and across these two rods is stretched canvas L, which forms a side guard, preventing the grass from falling over the side of the machine. A roller M is journaled in the end of the horizontal member of the L-shaped bracket K, and this roller normally lies a slight distance from off the ground, and the purpose of this roller is that if either or both of the caster-wheels F should fall within a depression in the ground the roller M then coming in contact with the ground would keep the stationary cutter-blade C at the proper distance from the ground and the grass the right length.

N is an endless apron which passes around the idle roller O, journaled in the elbows of the L-shaped brackets K. This apron N also passes around the roller P, journaled between the side bars G at the upper and rearward end of the machine. The upper end of this apron N is adapted to travel rearwardly as the machine advances.

Q is a semicircular grass-receptacle, which is pivoted to the side bars G at the point R, and the rounded portion of this receptacle extends downward to a point near the ground. The idle apron-roller O being journaled at a point near the rear of the cylindrical cutter B will cause the apron N to receive the cut grass as it is thrown from the cutters, and as the apron travels rearwardly the cut grass will be carried over the roller P and fall within the receptacle Q.

S is a roller which is usually used in rolling over the grass after it is cut. This roller is journaled in the rear of the horizontal frame of the machine and supports the machine at the rear. This roller S also furnishes motive power to the apron N by means of the belt or chain T, which passes around the sprocket-wheel $u$, secured upon the same shaft as the roller S. At a point along the side bar G a short shaft or stud is secured, upon which is journaled the small sprocket-wheel $v$, around which passes the chain T. Secured to this small sprocket-wheel $v$ and adapted to revolve therewith is a larger sprocket-wheel $w$, around which passes another chain X, which chain also passes around a sprocket-wheel Y, journaled in the side bar.

Y' is a gear-wheel secured upon the same shaft as the sprocket Y, and this gear-wheel meshes with another gear-wheel $Y^2$, journaled loosely upon the same shaft as the roller P.

P' is a ratchet-wheel, which is secured upon the same shaft as the roller P.

$P^2$ is a pawl secured to the gear-wheel $Y^2$, which is adapted to engage the teeth of the ratchet-wheel P' and held in engagement with such teeth by means of the spring $P^3$. Thus when the gear-wheel $Y^2$ is rotated in the direction of the arrow, Fig. 4, the pawl will cause the ratchet-wheel to also rotate, which will in turn impart the motion to the roller P and the apron N; but if the machine is caused to travel backward for any purpose whatsoever the gear-wheel $Y^2$ will then revolve in the opposite direction, and then the pawl will slip over the ratchet-teeth without revolving the ratchet-wheel, and thus the apron N will remain stationary during this backward movement of the machine. Thus motion is communicated from the roller S to the apron-roller P, which will cause said apron to travel backward and upward.

The sides of the grass-receptacle Q are pivoted to the side bars G upon the outside, and the rear end of the receptacle passes outside of the ends of the side bars G, and this rear end of the receptacle Q has secured to it the link Z. The other end of this link is secured to a lever $a$, which is pivoted to the platform D at the point $b$. This link Z and lever $a$ are for the purpose of depositing the cut grass after the said receptacle is filled and is accomplished by simply pushing the lever $a$ forward, which will rock the receptacle Q upon the pivot R and invert the same, and after the grass has been deposited by pulling the lever back the receptacle will resume its normal position. To the upper end of the shanks of the caster-wheels F are secured rigidly the rods $d$. To the inner ends of these rods are secured links $e$. The other ends of these links are connected to each end of a cross-bar $f$, which cross-bar is pivoted in its center at the point $g$ to the platform D. Footpieces $h$ are secured upon the links $e$. In these footpieces $h$ are adapted to rest the feet of the operator, and by pressing forward one of these the caster-wheels will be turned at an angle in one direction, and by pressing forward on the other the angle will be reversed. Thus the machine can be steered without the use of the hands.

$i$ is a draft-bar, which is pivoted at the forward end of the framework of the machine and is supported by a link $j$, one end of which is secured to the draft-bar and the other end to the seat-support.

The advantage of my invention is that by a very simple arrangement and the few number of parts I provide effective means of conveying the cut grass from the rotary cutter to a receptacle in the rear of the machine, and this receptacle being located in the rear of the machine can be made any size desired, and to empty such receptacle in the horse-power machine the operator does not have to leave the seat of the machine, and a further object of my invention is that by providing an apparatus in the horse-power mower whereby the machine can be steered with foot power the driver does not have to depend upon the horses for guiding the machine.

Of course I do not wish to be limited to the exact construction here shown, as slight modifications could be made without departing from the spirit of my invention.

Having thus fully described my invention, what I claim as new and useful is—

1. In combination, in a lawn-mower, a framework, a cylindrical cutter journaled in said framework, a stationary cutter-blade also secured in said framework, two caster-wheels journaled in the forward end of the machine and adapted to support said forward end, a roller journaled in the rear end of the framework and adapted to support the rear of the machine, side bars extending upward and rearward at an angle from the main frame, a grass-receiving receptacle pivoted to said side bars and depending therefrom, a roll journaled in the framework of the machine at a point near and in the rear of the cylindrical cutters, a roll journaled between the side bars near their upper ends, means for communicating power from the traction-roller to the last-named roll for the purpose of revolving the same, an endless apron adapted to pass around the two rolls, a link connected to the rearward end of the receptacle, a lever pivoted at the forward end of the machine to which the forward end of the link is connected for the purpose of inverting the receptacle, a small roller journaled in the framework of the machine between the cylindrical cutter and the rear traction-roller, and means adapted to be operated by the feet of the rider for turning the caster-wheels to steer the machine, substantially as described and for the purpose specified.

2. In combination with a lawn-mower, side bars secured to the framework of the lawn-mower and extending upwardly and rearwardly at an angle therefrom, a semicircular grass-receiving receptacle pivoted to and depending from said side bars, means extending to the forward end of the machine for the purpose of inverting the grass-receiving receptacle for the purpose of emptying the same, a roller journaled in the upper end of the side bars, a sprocket-wheel journaled loosely upon the same shaft as the said roller, a chain adapted to pass around said sprocket-wheel and communicate motion to the same from a suitable source of power, a ratchet-wheel secured upon the same shaft as the roller, a pawl pivoted upon the sprocket-wheel and adapted to engage the teeth of the ratchet-wheel when the sprocket-wheel is revolved in one direction, a spring adapted to hold the pawl in engagement with the ratchet-teeth and allow the pawl to slip over the ratchet-teeth when the sprocket-wheel is revolved in the opposite direction, a roller journaled in the framework of the machine at a point near to and in the rear of the rotary cutters of the mower, an endless apron adapted to pass around these two rollers and be driven by friction with the upper rearward roller, side guards arranged upon each side of the endless apron and supported by the framework of the machine, substantially as described and for the purpose specified.

In testimony whereof I have hereunto affixed my signature in the presence of two subscribing witnesses.

WILLIAM J. GLEASON.

Witnesses:
 FRED. W. CASSIDY,
 CHARLES E. LEVER.